(12) United States Patent
Zhang et al.

(10) Patent No.: US 11,156,829 B2
(45) Date of Patent: Oct. 26, 2021

(54) PUPIL EXPANDER CAILIBRATION

(71) Applicant: Facebook Technologies, LLC, Menlo Park, CA (US)

(72) Inventors: Bo Zhang, Redmond, WA (US); Yijing Fu, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 298 days.

(21) Appl. No.: 16/524,975

(22) Filed: Jul. 29, 2019

(65) Prior Publication Data

US 2021/0033856 A1 Feb. 4, 2021

(51) Int. Cl.
| | |
|---|---|
| *G02B 27/00* | (2006.01) |
| *G02B 27/01* | (2006.01) |
| *G06F 3/01* | (2006.01) |

(52) U.S. Cl.
CPC ..... *G02B 27/0081* (2013.01); *G02B 27/0093* (2013.01); *G02B 27/0172* (2013.01); *G06F 3/013* (2013.01); *G02B 2027/0123* (2013.01)

(58) Field of Classification Search
CPC ............ G02B 27/0081; G02B 27/0093; G02B 27/0172; G02B 2027/0123; G02B 2027/0178; G02B 2027/0125; G02B 27/62; G06F 3/013; G09G 3/006
See application file for complete search history.

(56) References Cited

U.S. PATENT DOCUMENTS

| | | | | |
|---|---|---|---|---|
| 10,260,864 B2* | 4/2019 | Edwin | ................ | H04N 13/383 |
| 10,378,882 B2* | 8/2019 | Yeoh | .................. | H04N 13/144 |
| 10,571,251 B2* | 2/2020 | Edwin | ................ | H04N 13/398 |
| 10,861,415 B2* | 12/2020 | Fu | ............................ | G02B 6/10 |
| 2010/0008591 A1 | 1/2010 | Su et al. | | |
| 2013/0093646 A1* | 4/2013 | Curtis | ............... | G02F 1/133606 345/1.3 |
| 2017/0122725 A1* | 5/2017 | Yeoh | .................... | H04N 13/398 |
| 2017/0124928 A1* | 5/2017 | Edwin | .................... | G06T 15/20 |
| 2019/0187482 A1* | 6/2019 | Lanman | ............. | G02B 27/0172 |
| 2019/0222830 A1* | 7/2019 | Edwin | ...................... | G06F 3/167 |
| 2019/0226830 A1* | 7/2019 | Edwin | ..................... | G06F 3/013 |
| 2019/0323825 A1* | 10/2019 | Yeoh | ....................... | G09G 3/003 |
| 2020/0043201 A1 | 2/2020 | Tanaka et al. | | |
| 2020/0057307 A1* | 2/2020 | Yoshikaie | .......... | G02B 27/4272 |
| 2020/0058266 A1* | 2/2020 | Fu | ....................... | G02B 27/0179 |

(Continued)

OTHER PUBLICATIONS

PCT/US2020/042670 Search Report dated Oct. 8, 2020.

*Primary Examiner* — Bao-Luan Q Le
(74) *Attorney, Agent, or Firm* — Pequignot + Myers; Matthew A. Pequignot

(57) ABSTRACT

A near-eye display (NED) using a pupil expander to expand an eyebox of the NED may suffer from local variations of throughput and color reproduction introduced by the pupil expander of the display. To offset or compensate these variations, the pupil expander, e.g. a pupil-replicating waveguide, may be characterized at a plurality of non-uniformly spaced grid of test points, with the test points disposed more densely at areas of high spatial variation of the throughput or color shift introduced by the pupil expander. The throughput or color shift may be integrated over at least a portion of the field of view of the NED. To determine the areas of high spatial variation, an initial test may be performed at uniformly spaced test grid locations.

20 Claims, 13 Drawing Sheets

(56) References Cited

U.S. PATENT DOCUMENTS

2020/0225024 A1\* 7/2020 Edwin .................... G09G 3/006
2020/0409458 A1\* 12/2020 Smithwick ............. A61B 3/125
2021/0148697 A1\* 5/2021 Yeoh ...................... G09G 3/003
2021/0223859 A1\* 7/2021 Sun ........................ G06F 3/012

\* cited by examiner

PUPIL EXPANDER CAILIBRATION

TECHNICAL FIELD

The present disclosure relates to wearable headsets, and in particular to components, modules, and methods for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desirable for head-mounted displays. Because a display of HMD or NED is usually worn on the head of a user, a large, bulky, unbalanced, or heavy display device would be cumbersome and may be uncomfortable for the user to wear. Compact display devices may be based on an image projector including a miniature display panel or a beam scanner.

Projector-based displays provide images in angular domain. Such images can be observed by a user's eye directly, without an intermediate screen. A pupil expander carries the image in angular domain to the user's eye, and expands the output pupil of the projector for ease of observation. The lack of a screen in a projector display enables size and weight reduction.

For many types of pupil expanders, a luminance and color transfer characteristic depends on an observation location within an eyebox of the display. This effect, when not properly compensated, may result in artificial local coloring of the image displayed to the user.

SUMMARY

In accordance with the present disclosure, there is provided a method of calibrating a pupil expander. The method includes providing image light at an input pupil of the pupil expander. The image light conveys an image in angular domain. An angular distribution of a parameter of the image light is obtained at a plurality of non-uniformly spaced grid locations at an output pupil of the pupil expander. An angular dependence of a variation of the parameter introduced by the pupil expander into the image light is determined across the output pupil from the obtained angular distribution of the parameter. A spatial density of the non-uniformly spaced grid locations varies across the output pupil, being greater at an area of the output pupil having a larger spatial derivative of the variation of the parameter averaged over at least a portion of a field of view of the image. The parameter may include for example at least one of: a color coordinate of the image light; power of a color channel; or power of a luminance channel of the image light. The spatial density of the non-uniformly spaced grid locations across the output pupil may be e.g. directly proportional to the spatial derivative of the averaged variation of the parameter.

In some embodiments, the method further includes determining the non-uniformly spaced grid locations by: obtaining the averaged variation of the parameter of the image light at a plurality of first grid locations at the output pupil of the pupil expander; determining the averaged variation of the parameter across the output pupil by interpolation between the plurality of first grid locations; and obtaining, from the averaged variation of the parameter across the output pupil, the spatial derivative of the determined averaged variation of the parameter across the output pupil. The first grid locations may be uniformly spaced. The averaged variation of the parameter may be determined by interpolation at a plurality of second grid locations spaced more densely than the plurality of first grid locations.

In some embodiments, the averaged variation of the parameter is determined by averaging an angular distribution of the parameter variation over the field of view of the image. The non-uniformly spaced grid may include at least one of a rectangular grid or a polygonal grid, or a radial grid having a center proximate the area of the output pupil having the larger spatial derivative of the averaged parameter.

In accordance with the present disclosure, there is further provided a method of operating a near-eye display (NED) comprising an image projector for providing image light conveying an image in angular domain, a pupil expander operably coupled to the image projector for expanding the image light over an eyebox of the NED, and an eye tracker for determining position of a user's eye pupil in the eyebox. The method includes using the eye tracker to determine a current position of the user's eye pupil in the eyebox; obtaining an angular dependence of a variation of a parameter of the image light introduced by the pupil expander at the determined position of the user's eye pupil by interpolation between previously determined angular dependencies of variation of the parameter at a plurality of non-uniformly spaced grid locations at the eyebox; and adjusting the image to at least partially offset the angular dependence of the variation introduced by the pupil expander. A spatial density of the non-uniformly spaced grid locations varies across the eyebox, being greater at an area of the eyebox having a larger spatial derivative of the variation of the parameter averaged over at least a portion of a field of view of the image. The parameter may include e.g. at least one of: a color coordinate of the image light; power of a color channel; or power of a luminance channel of the image light. By way of a non-limiting example, the spatial density of the non-uniformly spaced grid locations across the output pupil may be directly proportional to the spatial derivative of the averaged variation of the parameter.

In some embodiments of the above method, the non-uniformly spaced grid locations has been determined by obtaining the averaged variation of the parameter of the image light at a plurality of first grid locations at the eyebox; determining the averaged variation of the parameter across the eyebox by interpolation between the plurality of first grid locations; and obtaining, from the averaged variation of the parameter across the eyebox, the spatial derivative of the determined averaged variation of the parameter across the eyebox. The averaged variation of the parameter may be determined by interpolation at a plurality of second grid locations spaced more densely than the plurality of first grid locations.

In accordance with the present disclosure, there is further provided a near-eye display (NED) comprising image projector for providing image light conveying an image in angular domain, a pupil expander operably coupled to the image projector for expanding the image light over an eyebox of the NED, an eye tracker for determining position of a user's eye pupil in the eyebox, and a controller operably coupled to the image projector and the eye tracker. The controller is configured to use the eye tracker to determine a current position of the user's eye pupil; obtain an angular dependence of a variation of a parameter of the image light introduced by the pupil expander at the determined position of the user's eye pupil by interpolation between previously determined angular dependencies of variation of the parameter at a plurality of non-uniformly spaced grid locations at the eyebox of the NED; adjust the image to at least partially offset the angular dependence of the variation introduced by the pupil expander; and cause the image projector to emit the image light conveying the adjusted image. A spatial density of the non-uniformly spaced grid locations varies across the eyebox, being greater at an area of the eyebox having a larger spatial derivative of the variation of the parameter averaged over at least a portion of a field of view of the image.

In some embodiments, the spatial density of the non-uniformly spaced grid locations across the eyebox is directly proportional to the spatial derivative of the averaged variation of the parameter. The parameter may include at least one of: a color coordinate; power of a color channel; or power of a luminance channel of the image light. The pupil expander may include a pupil-replicating waveguide.

BRIEF DESCRIPTION OF THE DRAWINGS

Exemplary embodiments will now be described in conjunction with the drawings, in which.

DETAILED DESCRIPTION

Figure 1A:
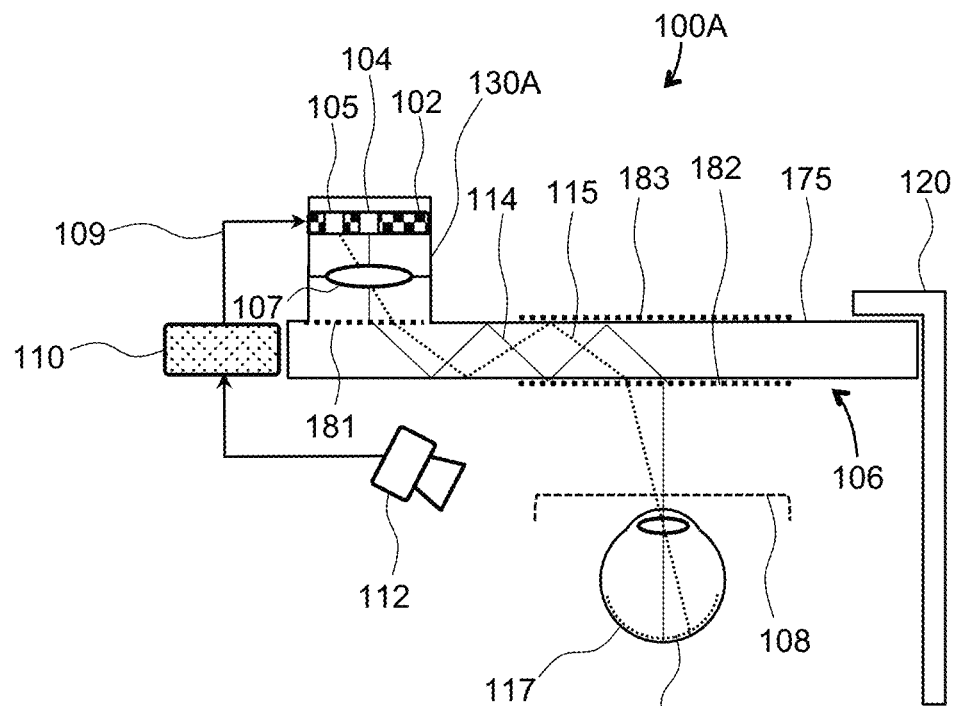
FIG. 1A is a cross-sectional view of a near-eye display (NED) with an image projector including a miniature display panel.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A pupil expander, e.g. a pupil replication waveguide, functions to enlarge an output pupil of an image projector of a near-eye display (NED) to enable users to see the imagery generated by the image projector without having to adjust the NED. The output pupil is enlarged over an entire eyebox of the NED to enable users with different distances between eyes, termed interpupillary distances, and with different facial features, to wear the NED comfortably. The pupil expander achieves this by providing multiple offset copies of an angular fan of beams generated by the image projector, and spreading the multiple offset copies of the beam fan over the eyebox. Herein the term "eyebox" means a geometrical area for the user's eye where a good-quality image may be observed by a user of the NED.

Pupil replication waveguides may include diffraction gratings and other wavelength-selective optical elements to redirect and spread image light. The wavelength-selective optical elements may cause optical throughput of the waveguide to be wavelength dependent. Furthermore, image light may travel along multiple paths inside a pupil replication waveguide, resulting in wavelength dependence of optical throughput due to multipath optical interference. The wavelength-dependent optical throughput may cause artificial coloration of the displayed image. Such color distortion effects are often dependent on the position of the eye relative to the waveguide, i.e. position of the eye in the eyebox.

The position of the eye's pupil in the eyebox of the NED may be determined in real time by employing an eye tracking system. The determined position of the eye may be used to provide a dynamic compensation of the color distortion caused by multipath propagation and other effects in a pupil replication waveguide. The amount of required color compensation is both eyebox coordinate and beam angle dependent, which can make the color calibration a cumbersome and time-consuming process. Furthermore, the required computer memory storing for multiple color compensation maps may become prohibitively large.

In accordance with the present disclosure, the NED may be pre-calibrated at a grid of positions of the eye at the eyebox. For eye positions between the calibrated points of the grid, an interpolation of the required dependencies of the color transfer function and optical throughput of the pupil replicator may be performed. The points of the grid may be pre-selected such that in areas of the eyebox where the dependencies of the color transfer function and/or optical throughput are varying sharply with position of the eye pupil at the eyebox, the grid points are located closer to one another. In areas of the eyebox where the dependencies of the color transfer function and/or optical throughput are changing slowly with eye pupil position, the density of grid points may be lowered accordingly.

Referring to FIG. 1A, an NED 100A includes an electronic display panel 102 comprising a plurality of pixels e.g. first 104 and second 105 pixels, for providing a plurality of light beams including first 114 and second 115 light beams shown with solid and dotted lines respectively. The optical power levels of the plurality of light beams are in accordance with image data 109 received by the electronic display panel 102 from an image source, e.g. from a controller 110 of the NED 100A. A pupil expander 106 is configured to receive the plurality of light beams and to provide the beams to an eyebox 108 of the NED 100A. The electronic display panel 102 and the pupil expander 106 may be supported by an NED body 120 having a shape of a pair of eyeglasses, for example.

A miniature lens 107 may be used to convert coordinates of the plurality of pixels into corresponding beam angles of the plurality of light beams. For example, an angle of the first light beam 114 at an eyebox 108 corresponds to a coordinate of the corresponding first pixel 104 of the electronic display panel 102, and an angle of the second light beam 115 at the eyebox 108 corresponds to a coordinate of the corresponding second pixel 105 of the electronic display panel 102. The miniature lens 107 and the electronic display panel together form a display-based projector 130A providing an image in angular domain.

It can be seen from FIG. 1A that the angles of the first 114 and second 115 light beams correspond to coordinates on a retina 124 of the user's eye 117. In this manner, the coordinates of the first 104 and second 105 pixels of the electronic display panel correspond to locations on the retina 124 of the user's eye 117, enabling the user to see the image displayed by the electronic display panel.

The throughput of the pupil expander 106, i.e. a ratio of output optical power to an input optical power of image light, has a dependence on a beam angle of the light beam at the eyebox 108. For example, the throughputs for the first 114 and second 115 light beams may be different. The dependence of the throughput on the beam angle may come from using a waveguide-based pupil expander.

In the embodiment shown in FIG. 1A, the pupil expander 106 includes a waveguide 175 supporting an in-coupling diffraction grating 181, an out-coupling diffraction grating 182, and a pupil expansion diffraction grating 183. The controller 110 is operably coupled to the electronic display panel 102 and configured to update the image data 109 to at least partially offset the variation of optical power and color introduced by the pupil expander 106, e.g. by pre-empha-sizing the image to be displayed in areas of low throughput, attenuating the image in areas of high throughput, shifting color coordinate(s) in opposite direction to the color coordinate(s) shift introduced by the pupil expander 106, and so on.

The throughput and color coordinate shift introduced by the pupil expander 106 into the image being conveyed may further depend on a beam coordinate of the light beam at the eyebox 108. To take this effect into account, the NED 100A may include an eye tracking system 112 for determining at least one of position and orientation of the user's eye 117 at the eyebox 108, which can be used to determine the coordinate of the eye's 117 pupil. The controller 110 may be operably coupled to the eye tracking system 112 and configured to update the image data 109 so as to at least partially offset the angular dependence of the color and/or throughput variation introduced by the pupil expander 106, by taking into account the position and/or orientation of the user's eye 117 pupil determined by the eye tracking system 112.

In embodiments where the electronic display 102 comprises a plurality of color channels of a color image, for example red (R), green (G), and blue (B) color channels, the throughput of the pupil expander 106 may have a dependence on the coordinate and the angle of the light beam specific to each color channel. In such embodiments, the controller 110 may be configured to update the image data 109 on per color channel basis, that is, differently for each color channel, if needed. The image data 109 are updated by the controller 110 to at least partially offset the dependence of the throughput of the pupil expander 106 on the coordinate and the angle of the light beam for each color channel, by taking into account the at least one of position and orientation of a user's eye 117 determined by the eye tracking system 112. The NED 100A of FIG. 1A may be calibrated in advance, to obtain the dependence of optical throughput on beam parameters such as angle or coordinate. Separate device components e.g. the pupil expander components, or the entire display devices may be calibrated.

Figure 1B:
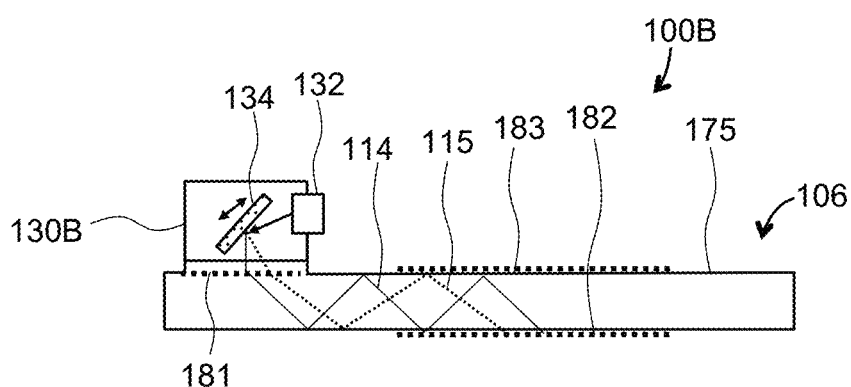
FIG. 1B is a partial cross-sectional view of an NED with an image projector including a beam scanner.

Referring to FIG. 1B, a scanning NED 100B is similar to the NED 100A of FIG. 1A, including a scanning image projector 130B instead of the display-based projector 130A comprising electronic display panel and the miniature lens 107. The scanning image projector 130B performs the same function, but instead of providing the image all at once, scans or rasters the image. To that end, the scanning image projector 130B includes a light engine 132 directing one or several light beams to a tiltable mirror 134, e.g. a microelectromechanical system (MEMS) tiltable mirror. As the tiltable mirror 134 is scanned, e.g. from an angle corresponding to the first light beam 114 to the angle corresponding to the second light beam 115, the optical power level and/or color(s) of the light beam(s) generated by the light engine 132 is adjusted to raster the image to be displayed. The scanning or rastering is performed fast enough, such that the user's eye 117 integrates the received optical power levels of the scanned beam(s) and sees a complete image.

Figure 2A:
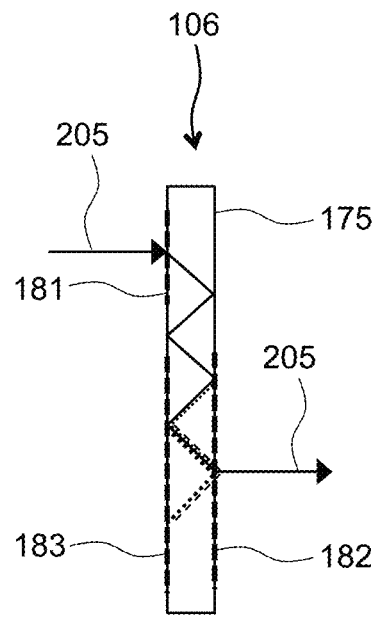
FIG. 2A is a side cross-sectional view of a waveguide-based 2D pupil expander usable in the NED of FIG. 1A or 1B.
Figure 2B:
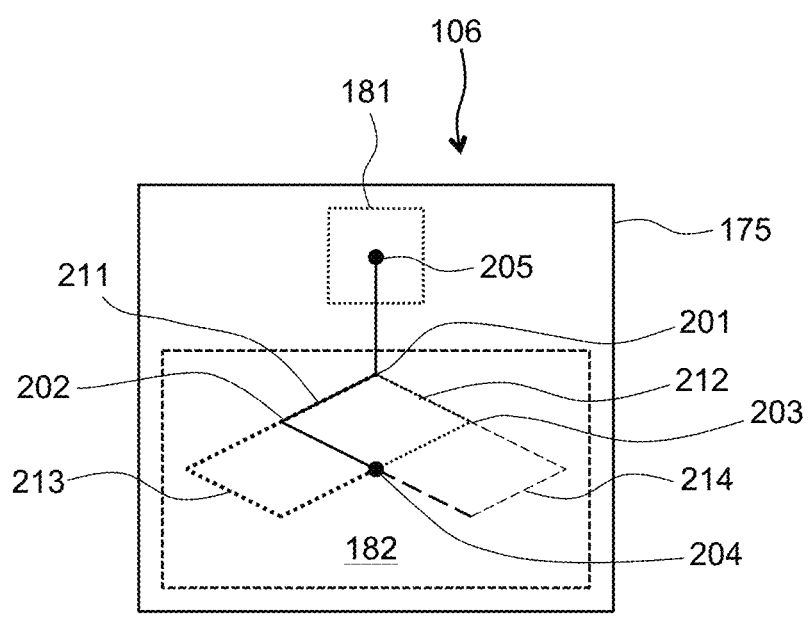
FIG. 2B is a plan view of the waveguide pupil expander of FIG. 2A, showing multiple paths of image light in the pupil expander.

Origins of the beam coordinate and angle dependence of the throughput of the pupil expander 106 of FIGS. 1A and 1B are further explained with reference to FIGS. 2A and 2B. FIG. 2A shows the pupil expander 106 in side view. A beam 205 of image light impinges onto the in-coupling diffraction grating 181, which diffracts the beam 205 to propagate towards the out-coupling diffraction grating 182. There, at a first point 201 (FIG. 2B), the optical path of the beam 205 splits in two: a first path 211 shown with a solid line, and a second path 212 shown with a thin dotted line. A third path 213, shown with a thick dotted line, splits off at a second point 202. Finally a fourth path 214, shown with a dashed line, splits off at a third point 203. All four paths 211, 212, 213, and 214 meet at a fourth point 204, where the beam 205 exits the waveguide 175. Out of the four paths 211, 212, 213, and 214, two—the first 211 and second 212—have nominally equal path lengths; and two—the third 213 and the fourth 214—have nominally equal, albeit different from the first 211 and second 212 paths, path lengths. Thus, a four-path interferometer is formed, which may result in a wavelength dependence of the throughput of the pupil expander 106. Furthermore, since the path lengths and their differences depend on the angle of incidence, or on the angle of diffraction of the beam 205 at the out-coupling diffraction grating 182 at the eyebox 108 (FIG. 1A), the throughput of the pupil expander 106 will also depend on the beam 205 angle. Yet furthermore, since the waveguide 175 may have a slight wedge or waving due to manufacturing tolerances, the path lengths and their differences may also depend on the beam 205 coordinate at the out-coupling diffraction grating 182, or at the eyebox 108, and the dependence may be different for each pupil expander manufactured.

The NEDs 100A of FIG. 1A and 100B of FIG. 1B may be calibrated to compensate the dependence of throughput and color performance on beam angle and coordinate, i.e. the pixel coordinate in angular domain (corresponding to beam angle) and position of the eye pupil in the eyebox (corresponding to beam coordinate). Separate device components, e.g. the pupil expander components, or the entire display devices may be calibrated.

Figure 3:
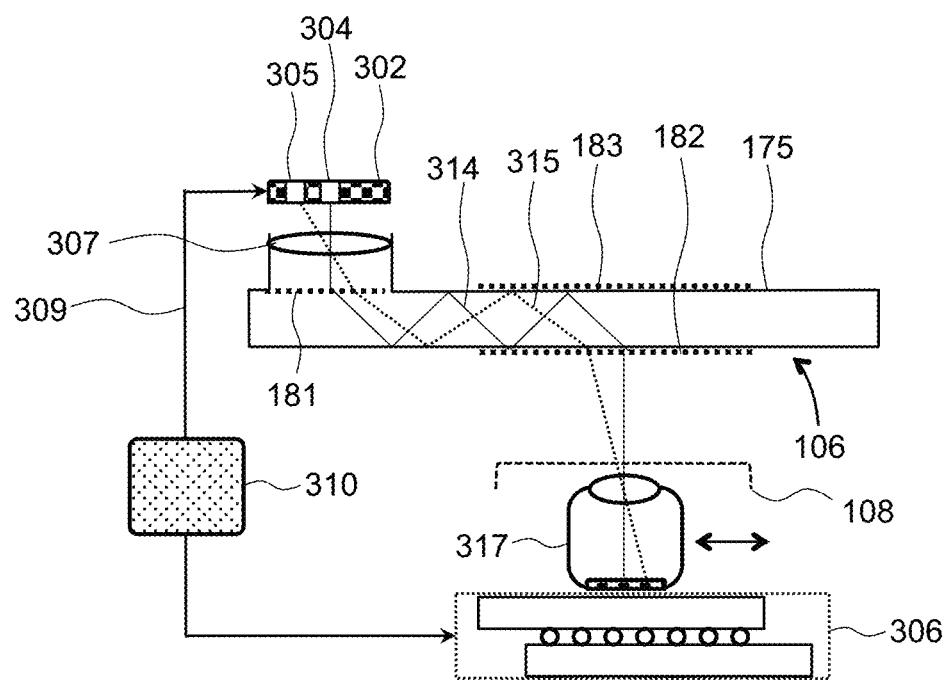
FIG. 3 is a cross-sectional view of a calibration apparatus for characterization of pupil expanders.

Turning to FIG. 3, a calibration apparatus 300 includes a test light source including a test display panel 302 and a lens 307, a test camera 317 on a platform 306, and a test controller 310 for providing test patterns 309 to the test display panel 302. By way of a non-limiting example, the test display panel 302 may include an electronic display panel having a plurality of pixels e.g. first 304 and second 305 pixels, for providing a plurality of beams including first 314 and second 315 test beams, which are shown in FIG. 3 with solid and dotted lines respectively. Alternatively, the test display panel 302 may be replaced with an extended light source of uniform light, e.g. white light with a Lambertian angular distribution. The test camera 317 may be constructed to closely mimic a human eye in its optical performance. For example, the test camera 317 may include a constant or variable input pupil having a pupil diameter or diaphragm matching the pupil diameter (or a range of diameters) of a human eye, an angle of view similar to that of a human eye, etc. The platform 306 may be a movable platform, a tiltable platform, or both movable and tiltable platform. The platform may include X, XY, or XYZ translation stages for translating the test camera 317 in the dimensions of width, height, and depth.

Figure 4:
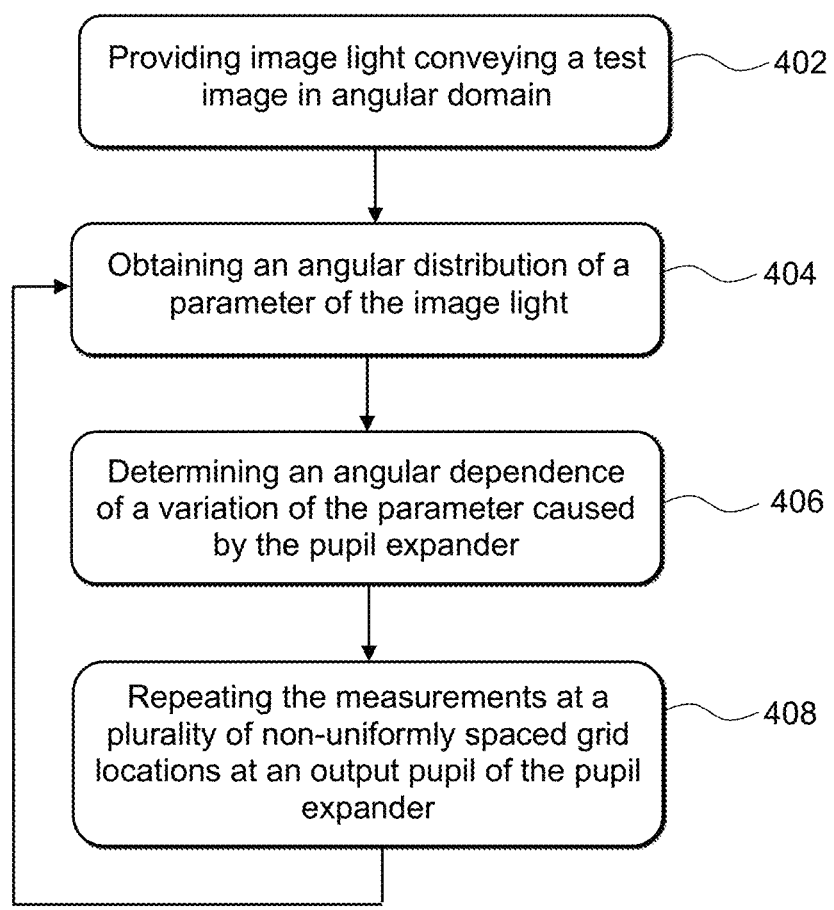
FIG. 4 is a flow chart of a method for calibrating a pupil expander using the calibration apparatus of FIG. 3.

Referring to FIG. 4 with further reference to FIGS. 1A, 1B, and FIG. 3, a method 400 of calibrating a pupil expander, e.g. the waveguide-based pupil expander 106 of FIGS. 1A and 1B, may be performed using the calibration apparatus 300 of FIG. 3. The method 400 includes providing (402) image light conveying a test image in angular domain at an input pupil of the pupil expander 106. The test image may include, without limitation, a black and white or a colored test pattern, a white field (i.e. a blank white image), a color channel field (e.g. red, green, and/or blue color channel), etc. The image light may include the first 314 and second 315 test beams, for example.

The method 400 further includes obtaining (FIG. 4; 404) an angular distribution of a parameter of the image light. The parameter may include a color coordinate of the image light, power of a color channel of the image light, and/or power of a luminance channel of the image light, to name just a few. In some embodiments, a flat white test pattern of a known optical power density may be provided at the input pupil of the pupil expander, such that the measured optical power density at the output pupil enables one to determine the pupil expander's throughput, and the measured color coordinate enables one to determine the pupil expander's color shift or color transfer function over the NED eyebox.

The method 400 further includes determining (406) an angular dependence of a variation of the parameter introduced by the pupil expander into the image light. The angular dependence of the variation of the parameter is determined across the output pupil from the obtained angular distribution of the parameter, e.g. by taking an image with the test camera 317 (FIG. 3). Since the test image is in angular domain, the angular dependence of the measured parameter(s) is on pixel-by-pixel basis, that is, the measured throughput and/or color shift is determined on pixel-by-pixel basis. These pixel-by-pixel calibration data enable subsequent optical throughput and color compensation to be on pixel-by-pixel basis, that is, each pixel of the image in angular domain conveyed by the image light propagating in the pupil expander may be individually corrected.

The method 400 further includes repeating (FIG. 4; 408) the test measurements at a plurality of non-uniformly spaced grid locations at an output pupil of the pupil expander, e.g. by translating the test camera 317 placed on the platform 306 (FIG. 3). A spatial density of the non-uniformly spaced grid locations varies across the output pupil, being greater at an area of the output pupil having a larger spatial derivative of the variation of the parameter integrated over at least a portion of a field of view (FOV) of the test image.

Figure 5:
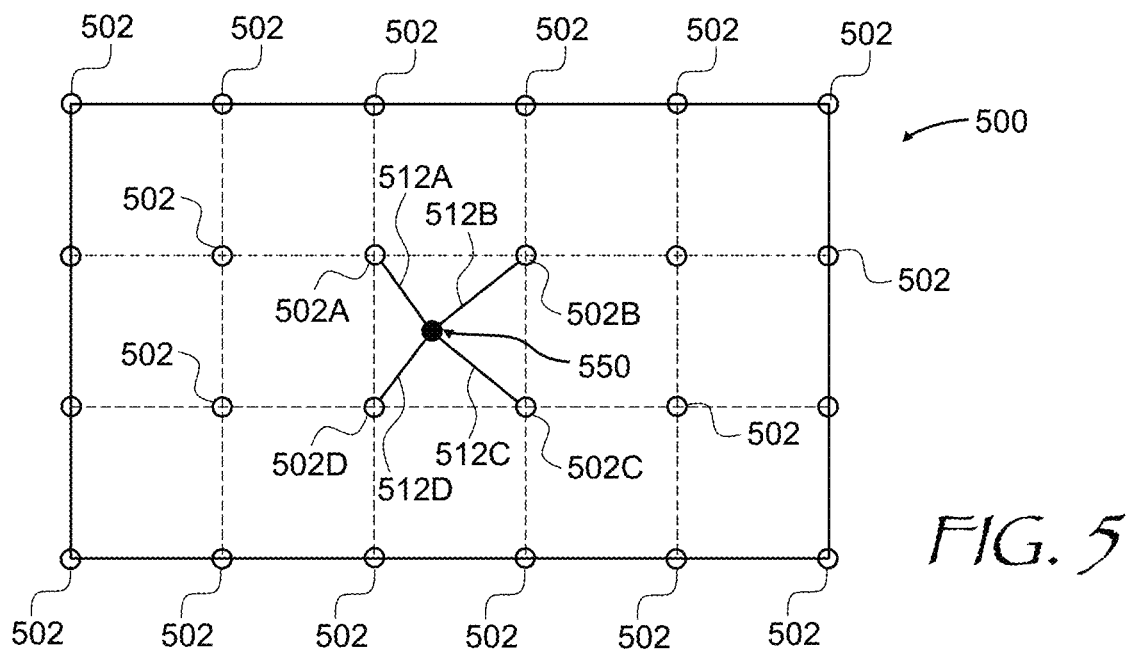
FIG. 5 is a schematic view of a uniform grid of calibration points spaced across an output pupil of the pupil expander.
Figure 6:
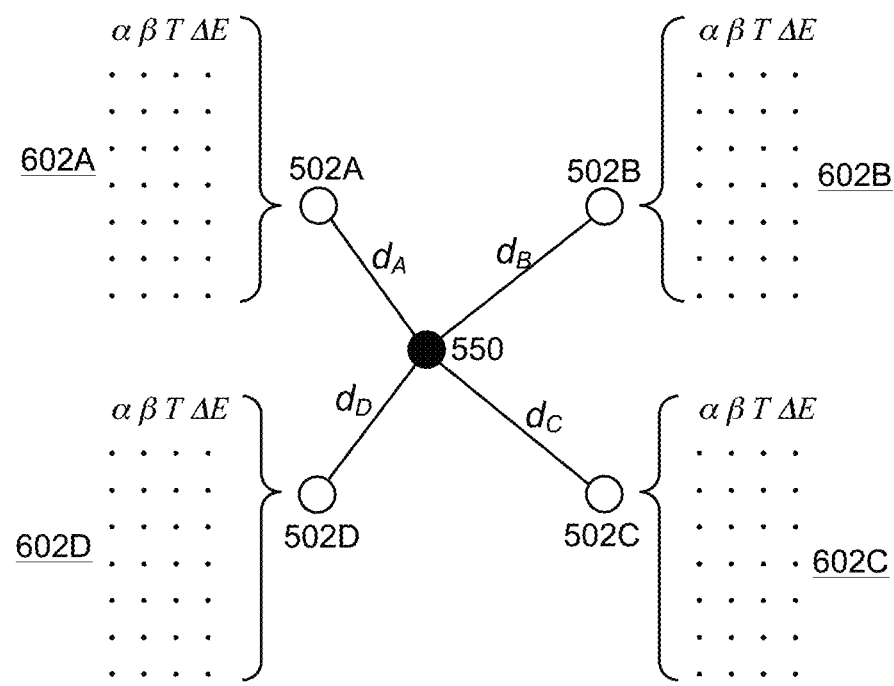
FIG. 6 is a schematic diagram illustrating interpolation between the grid of calibration points.

To highlight the advantages of using the non-uniform test grid, a uniform test grid will be considered first. Referring to FIG. 5, a rectangular test grid 500 includes a rectangular array of uniformly spaced test grid locations 502. Initially, the angle-dependent variation(s) of the parameter(s) of image light introduced by the pupil replicator, such as optical throughput T (reduction of optical power density across the image in angular domain), color transfer function $\Delta E$ (a shift of a color coordinate, E, of each pixel of the image, introduced by the pupil expander), etc., are determined at the uniformly spaced test grid locations 502 across an eyebox of the NED. These angle-dependent variations, e.g. T, $\Delta E$, may be stored as a table for each test grid location. For example, referring to FIG. 6 with further reference to FIG. 5, tabulated throughput T and color transfer function $\Delta E$ for each pixel with angular coordinates $(\alpha, \beta)$ is stored as a first table 602A for a first location 502A, a second table 602B for a second location 502B, a third table 602C for a third location 502C, and a fourth table 602D for a fourth location 502D.

The first 602A to fourth 602D tables may be used to calibrate an image to be displayed to a viewer wearing an NED in a following manner. An eye tracking system of the NED may determine that the viewer's eye is located at a location 550 (FIGS. 5, 6) between the first 502A, second 502B, third 502C, and fourth 502D test grid locations. A controller of the NED may then determine corresponding distances $d_A$, $d_B$, $d_C$, and $d_C$ from the eye pupil location 550 to the first 502A, second 502B, third 502C, and fourth 502D test grid locations, respectively, illustrated by straight lines 512A, 512B, 512C, and 512D, respectively. The controller may, for each angular coordinates $(\alpha, \beta)$ of an image pixel, determine the values of the parameter variation P as follows:

$$P(\alpha, \beta) = \frac{1}{d \cdot d_A} P_A(\alpha, \beta) + \qquad (1)$$
$$\frac{1}{d \cdot d_B} P_B(\alpha, \beta) + \frac{1}{d \cdot d_C} P_C(\alpha, \beta) + \frac{1}{d \cdot d_D} P_D(\alpha, \beta)$$
$$\text{where } d = \frac{1}{d_A} + \frac{1}{d_B} + \frac{1}{d_C} + \frac{1}{d_D}$$

where d is the sum for the inverse of the distances to A, B, C and D, e.g. the distance between the first location 502A and third location 502C or the distance between the second location 502B and the fourth location 502D, and P is the variation of an optical parameter introduced by the pupil expander, such as the optical throughput $T(\alpha, \beta)$ (a ratio of output to input optical power density across the image in angular domain) or color transfer function $\Delta E(\alpha, \beta)$ (a shift of a color coordinate, E, of each pixel of the image introduced by the pupil expander).

Figure 7A:
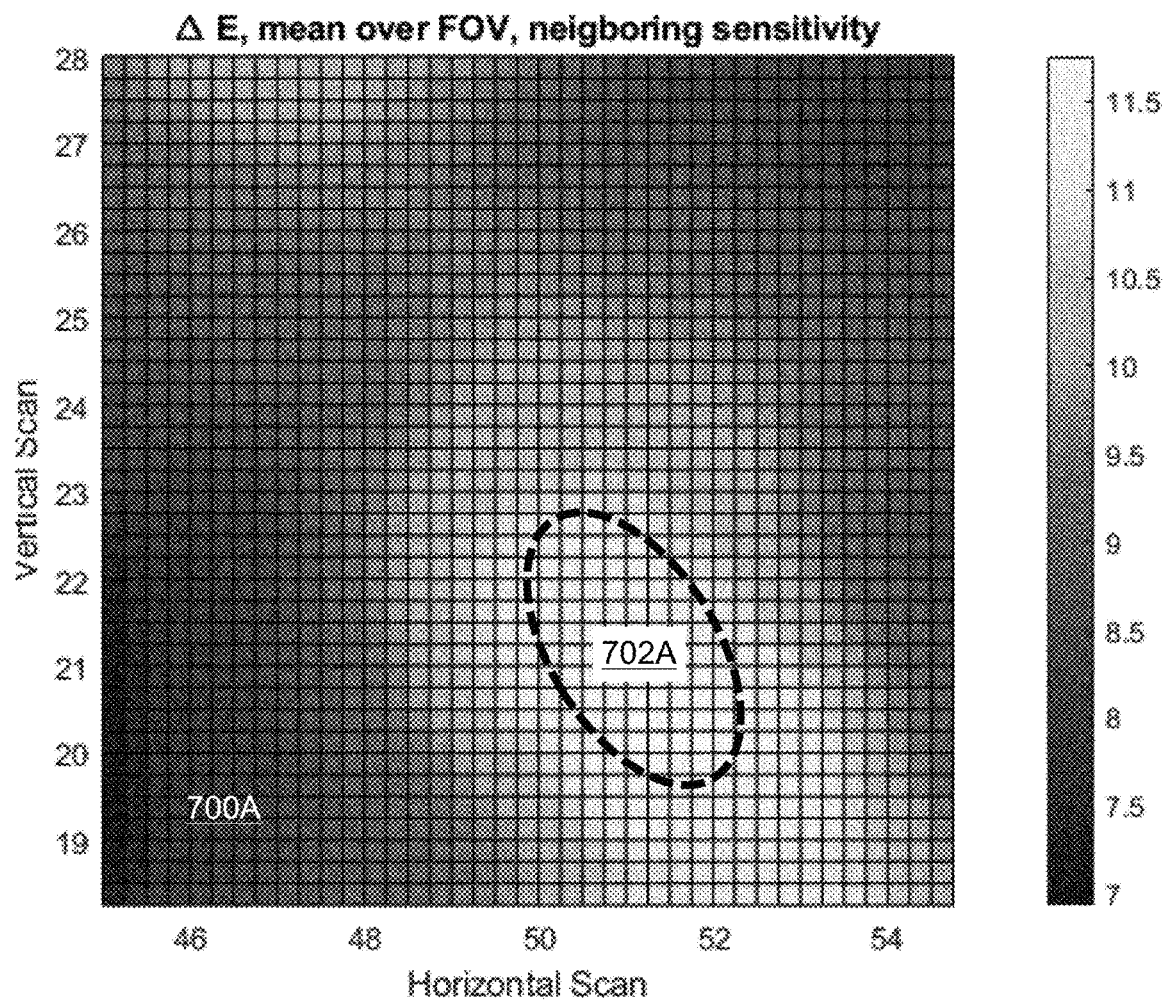
FIG. 7A is an example of a measured calibration sensitivity map showing rate of variation of a mean color difference averaged over a field of view (FOV) of the pupil expander under test.
Figure 7B:
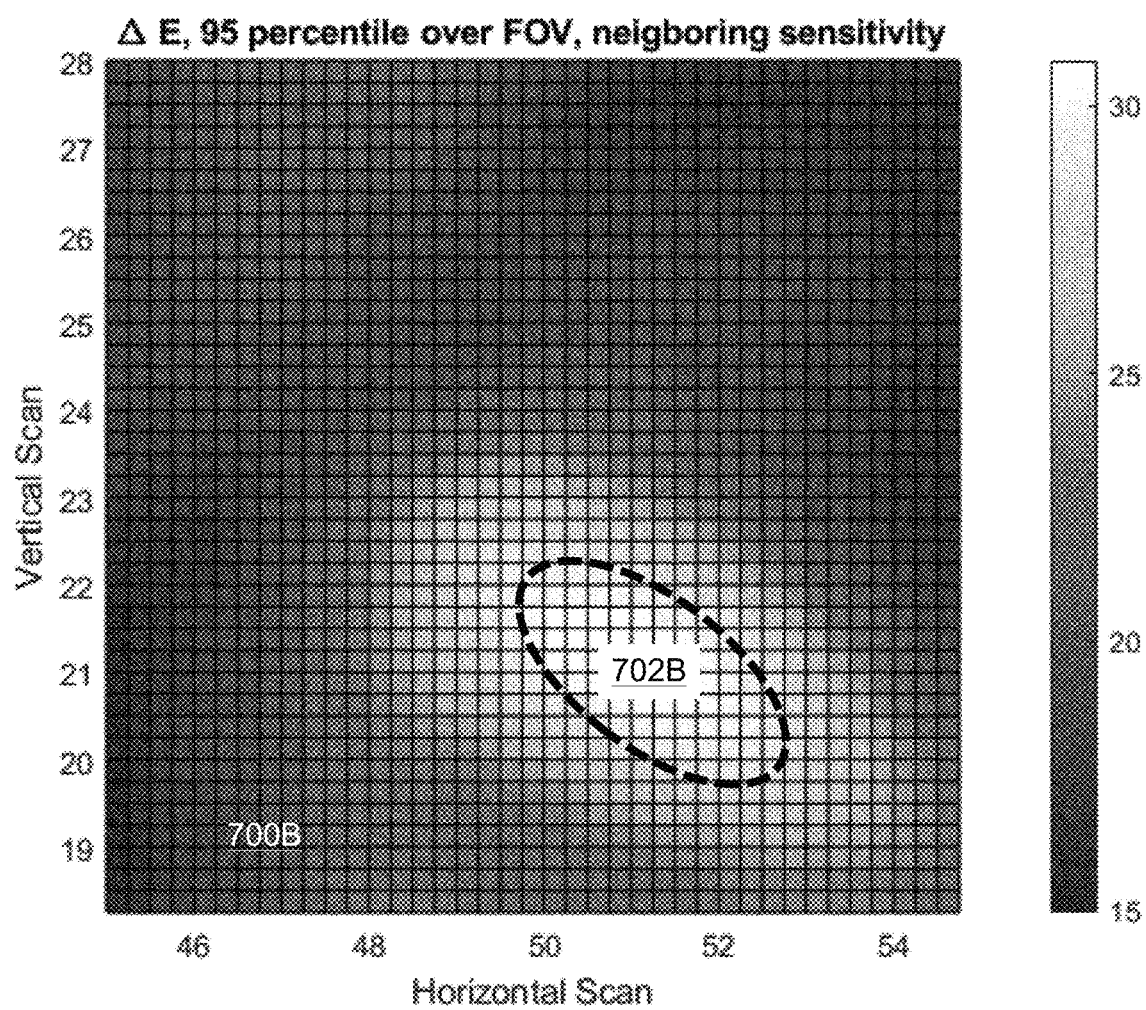
FIG. 7B is an example of a measured calibration sensitivity map showing rate of variation of a 95% percentile color difference averaged over a field of view (FOV) of the pupil expander under test.

One issue with the above approach to calibrating a pupil replicator/pupil expander is that the dependence of parameters, such as throughput T and especially color difference $\Delta E$ (e.g. in CIELAB coordinates), may be highly non-uniform. When the parameter is non-uniform i.e. has a sharp peak at some location in the eyebox, a linear interpolation provided by Eq. (1) between locations of a uniform test grid, such as the locations 502 of the rectangular test grid 500 of FIG. 5, may be not precise enough. As an illustration, referring to FIG. 7A, a "heat map" 700A of a measured mean color shift $\Delta E$ (in CIELAB coordinates) is shown for a test sample of a pupil-replicating waveguide. A mean value of the color shift $\Delta E$ is plotted as a function of output pupil linear coordinates, i.e. eyebox X, Y coordinates, in millimeters. The mean value of the color shift $\Delta E$ may be obtained by averaging over the FOV of the image, i.e. by integration over the image pixel coordinates $(\alpha, \beta)$. One can see that the color shift $\Delta E$ is distributed non-uniformly across the test pupil-replicating waveguide, having a pronounced peak at an area outlined with a dashed oval 702A. FIG. 7B shows a "heat map" 700B of a measured 95% value of the color shift $\Delta E$ distribution across the image pixel coordinates $(\alpha, \beta)$. The high-$\Delta E$ peak is disposed in FIG. 7B in an area outlined with an elongated dashed oval 702B.

In accordance with this disclosure, a grid of test points at which the pupil replicator is to be characterized by measuring throughput and/or color shift may be made non-uniform, such that a spatial density of the non-uniformly spaced grid locations varies across the eye box of NED. The spatial density is greater at an area of the output pupil having a larger spatial derivative of the variation of the parameter. For example, the spatial density of the non-uniformly spaced grid locations across the output pupil may be made directly proportional to the spatial derivative of the averaged variation of the parameter. The measured parameter change may be averaged over at least a portion of the FOV of the image.

Figure 8A:
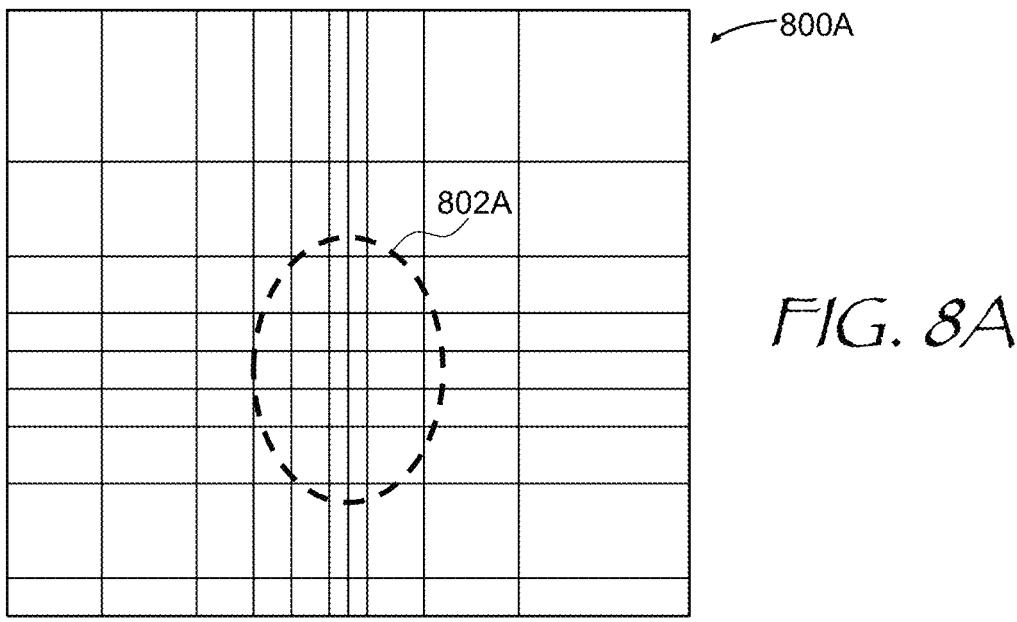
FIG. 8A is an example of a non-uniform rectangular grid of measurement points for calibrating a pupil expander having a non-uniform color sensitivity.

Several non-limiting illustrative examples of a non-uniform test grid are considered below. Referring first to FIG. 8A, a non-uniform rectangular grid 800A has a spatially varying grid pitch along X-direction (horizontal in FIG. 8A) and/or Y-direction (vertical in FIG. 8A). The X- and Y-density of the grid locations increased at an area 802A of high spatial derivative of the variation of the averaged optical parameter of the pupil replicator. By way of an example, the area 802A may be an area where optical throughput and/or color shift changes quickly, as compared to corner areas where the optical throughput and/or color shift is more slowly varying. The optical throughput may be measured across all color channels, or on channel-by-channel basis.

Figure 8B:
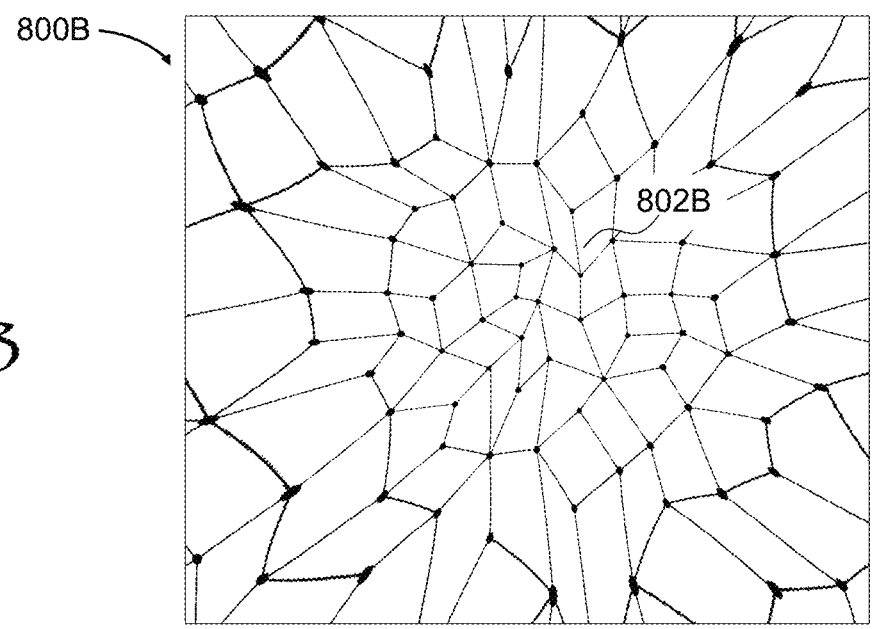
FIG. 8B is an example of a non-uniform mesh-type grid of measurement points for calibrating a pupil expander having a non-uniform color sensitivity.

Referring to FIG. 8B, a non-uniform mesh or polygonal grid 800B includes individual polygon-shaped grid cells. The polygons may include triangles, quadrilaterals, pentagon, hexagons, etc., and may be symmetric or non-symmetric. The density of the grid locations, i.e. the apexes of the grid cells, may be higher in an area 802B of high rate (spatial derivative) of variation of the selected optical parameter. The selected optical parameter may include a throughput at a particular color channel, luminance variation, color shift, etc. Throughout the specification, the term "high rate of variation" is to be understood in comparison with other areas of the eyebox/pupil replicator, i.e. areas where optical throughput and/or color shift varies more slowly spatially. The parameter may be measured across all color channels, or on channel-by-channel basis, and averaged over the entire FOV or a selected portion of the FOV, e.g. a central portion of the FOV.

Figure 8C:
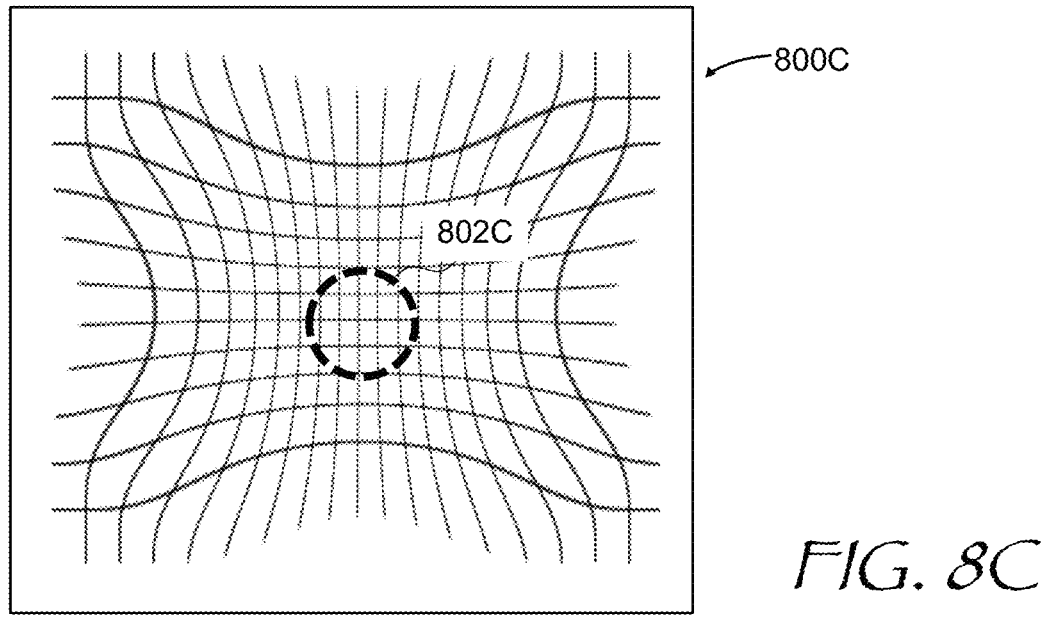
FIG. 8C is an example of a non-uniform stretchable grid of measurement points for calibrating a pupil expander having a non-uniform color sensitivity.

Referring to FIG. 8C, a non-uniform curvilinear grid 800C includes rectangular grid cells that are stretched, i.e. non-linearly expanded, at areas of low rate of spatial variation of a FOV-averaged parameter. The grid cells are densified, or non-linearly compressed, at an area 802C of high rate of spatial variation of a FOV-averaged parameter such as a per-channel or full luminance drop and/or color shift introduced at that location by the pupil expander.

Figure 8D:
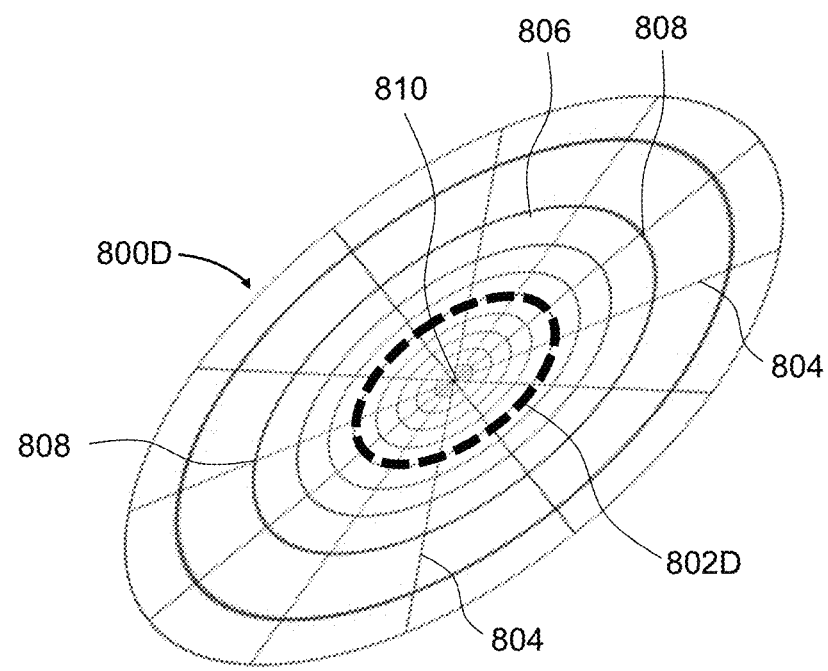
FIG. 8D is an example of a non-uniform radial grid of measurement points for calibrating a pupil expander having a non-uniform color sensitivity.

Turning to FIG. 8D, a non-uniform radial grid 800D is formed by radial lines 804 extending from a center 810 of an area 802D of fast spatial variation of the pupil replication parameter. The radial lines 804 are crossed by a set of concentric circumferential lines 806, the grid being formed by crossing points 808. Spatial density of the circumferential lines 806 may increase towards the center 810, which may be disposed proximate an area 802D having the larger spatial derivative of the averaged throughput. The circumferential lines 806 may be elliptical as shown, and may also be circular, meandering, etc. It is to be understood that the grids 800A-800D of FIGS. 8A to 8D are only examples, and many other non-uniform grid types and configurations are possible.

Figure 9:
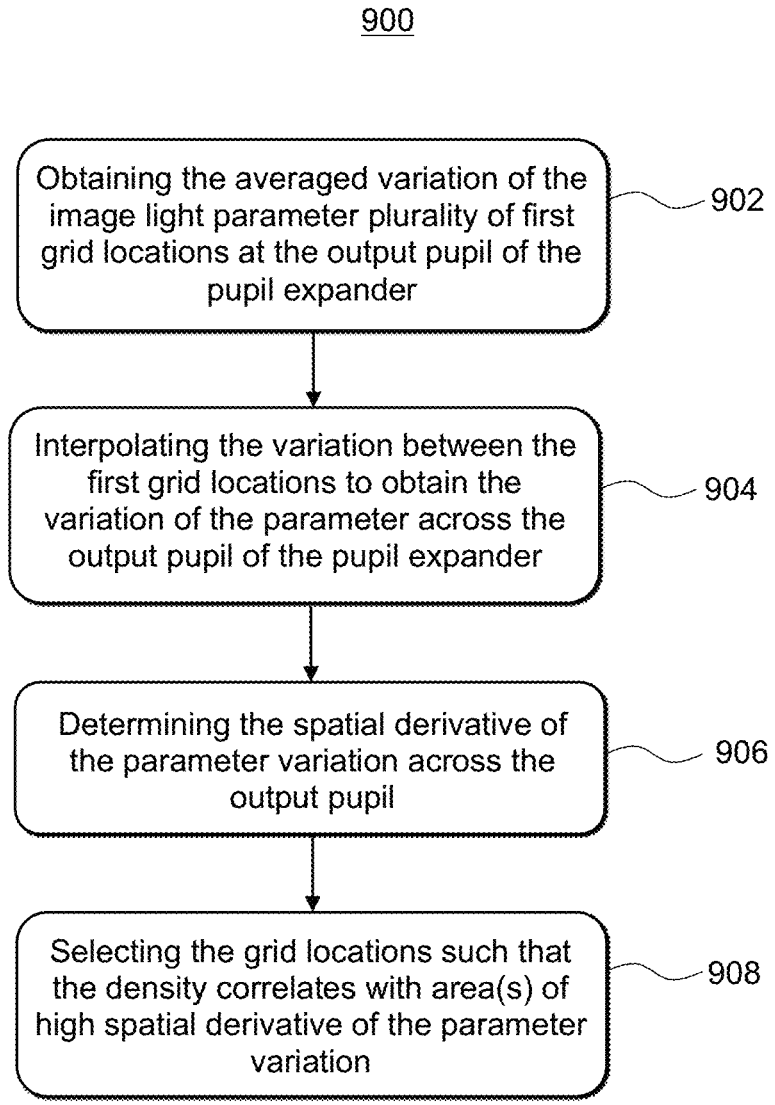
FIG. 9 is a flow chart of a method for obtaining a non-uniform calibration grid.

Referring now to FIG. 9, a method 900 for determining non-uniformly spaced grid locations for testing a pupil replicator includes obtaining (902) the averaged variation of the parameter of the image light at a plurality of first grid locations at the output pupil of the pupil expander. The first grid may be a pre-selected initial grid, e.g. a grid with uniformly spaced grid locations, such as the rectangular test grid 500 of FIG. 5. The averaged variation of the parameter across the output pupil may be determined (904) by interpolation between the plurality of first grid locations, e.g. as shown and explained above with reference to FIG. 6. The spatial derivative of the determined averaged variation of the parameter may then be obtained (906) from the averaged variation of the parameter. The spatial derivative may be obtained across the output pupil by interpolation the parameter values at a plurality of pre-defined second grid locations spaced more densely than the plurality of first grid locations. The second grid locations may be uniform or non-uniform. Then, the non-uniform grid locations are selected (908) such that the density of the non-uniform grid locations greater is greater at the area of the output pupil having a larger spatial derivative of the variation of the parameter averaged over at least a portion of a FOV of the image. The non-uniform grid may be generally rectangular, polar, waving, meandering, etc., for example as shown in FIGS. 8A to 8D above.

Figure 10:
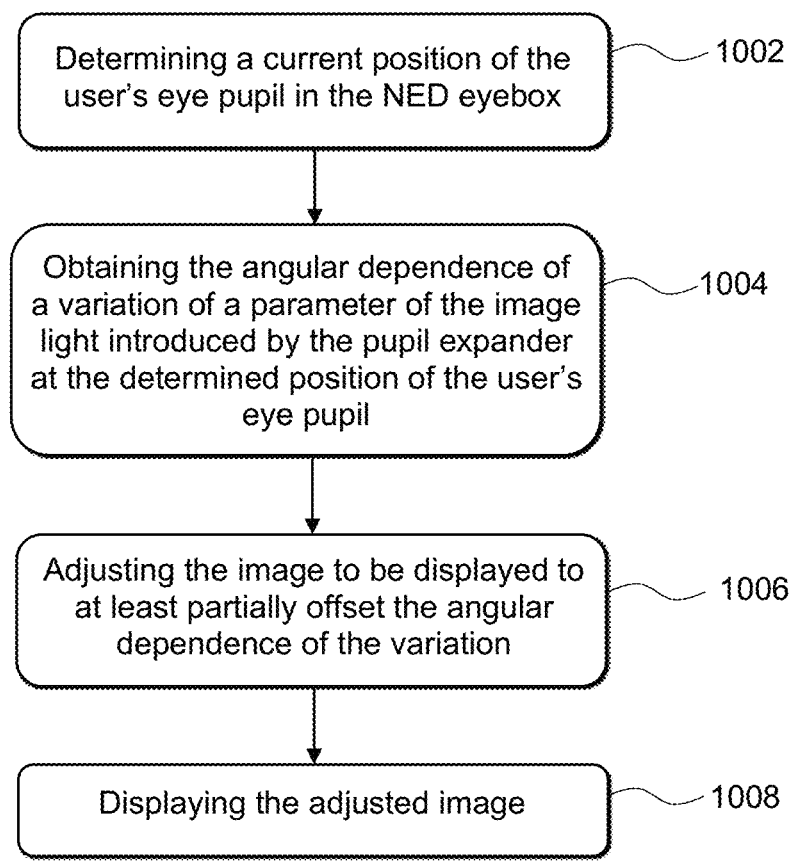
FIG. 10 is a flow chart of a method for operating a near-eye display.

Turning to FIG. 10, a method 1000 of operating an NED, e.g. the NED 100A of FIG. 1A or the scanning NED 100B of FIG. 1B, includes using an eye tracker to determine (1002) a current position of the user's eye pupil in the eyebox. To determine the current eye pupil position, the eye tracker may illuminate the eye with invisible light, e.g. infrared light, and obtain a series of images of the illuminated eye. The eye tracker may then determine the eye position and orientation inside the eyebox of the NED and determine the eye pupil position from the determined eye position and orientation, using a geometrical model of the eye.

An angular dependence of a variation of a parameter of the image light introduced by the pupil expander at the determined position of the user's eye pupil is obtained (1004) by interpolation between previously determined angular dependencies of variation of the parameter at a plurality of non-uniformly spaced grid locations at the eyebox. The parameter may include a color variation, a luminance variation, an optical throughput at a particular color channel, a sum and/or a difference of the optical throughput of different color channels, etc.

The image to be displayed may be adjusted (1006) to at least partially offset the obtained angular dependence of the variation introduced by the pupil expander. For example, in areas of the output pupil where the optical throughput of the pupil expander is lower, the brightness of the image may be pre-emphasized to offset the lower optical throughput. In areas of the output pupil introducing a known color variation due to different throughput at different color channels e.g. red (R), green (G), and blue (B) color channels, the color of the image may be shifted by the same amount in an opposite direction, etc.

To provide an accurate interpolation of the parameter variation in areas of the output pupil/eyebox with high rate of spatial variation of the parameter, the spatial density of the non-uniformly spaced grid locations may be made to vary across the output pupil/eyebox, being greater at an area of the output pupil having a larger spatial derivative of the variation of the parameter averaged over at least a portion of the FOV of the image. The non-uniformly spaced grid may be selected in advance, during a calibration stage of the NED, using e.g. the method 900 of FIG. 9. The adjusted image may then be displayed (1008).

The method 1000 may be implemented e.g. in the controller 110 of the NED 100A of FIG. 1A, for example. The method 1000 may be implemented in software, firmware, some combination thereof, etc., depending on configuration of the NED controller.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
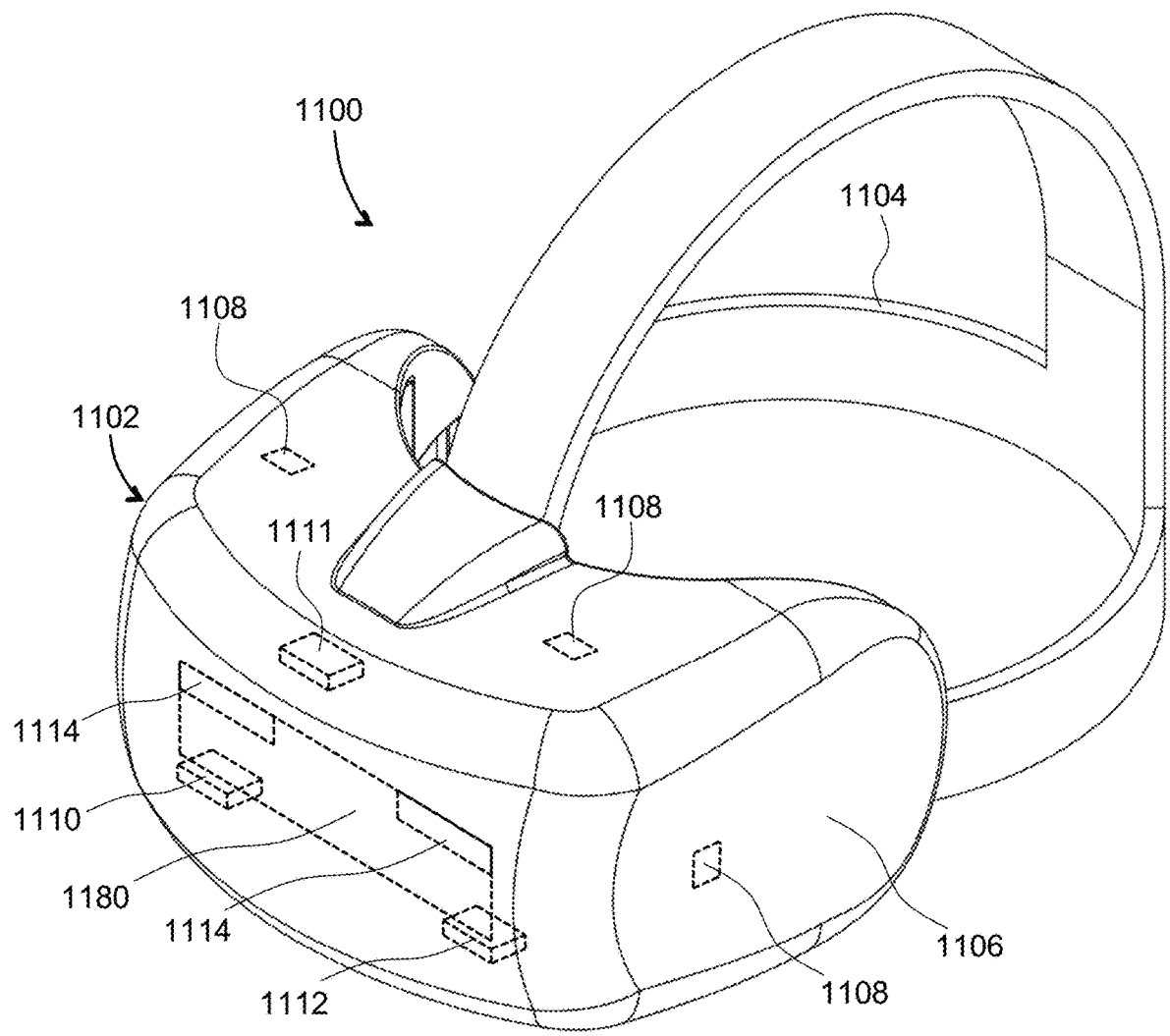
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 is an embodiment of the NED 100A of FIG. 1A or the scanning NED 100B of FIG. 1B, for example. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
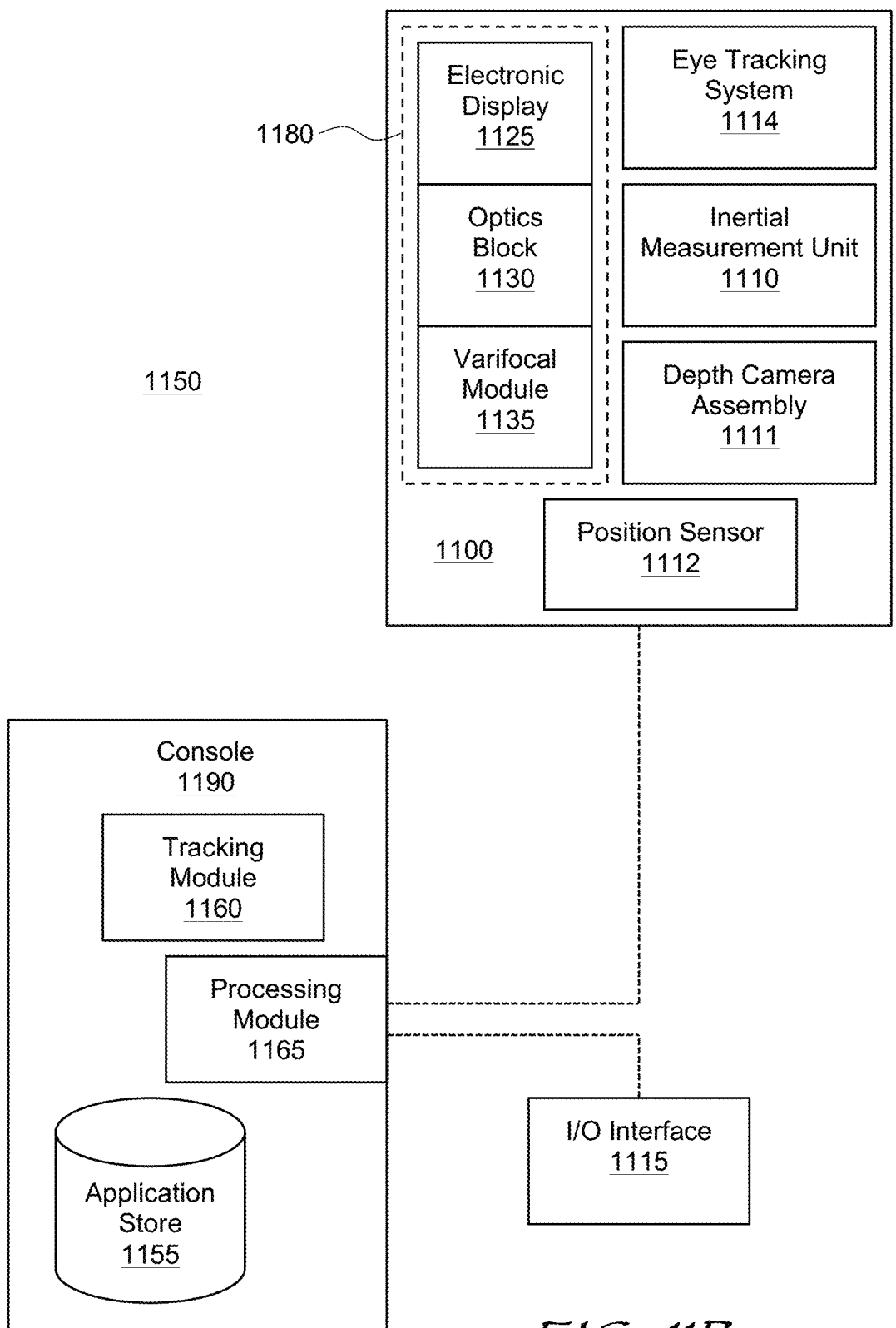
FIG. 11B is a block diagram of a virtual reality system including the headset of FIG. 11A.

Referring to FIG. 11B, an AR/VR system 1150 is an example implementation of an AR/VR system based on the NED 100A of FIG. 1A, or the scanning NED 100B of FIG. 1B for example. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam—Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of calibrating a pupil expander, the method comprising:
    providing image light at an input pupil of the pupil expander, the image light conveying an image in angular domain;
    obtaining an angular distribution of a parameter of the image light at a plurality of non-uniformly spaced grid locations at an output pupil of the pupil expander; and
    determining an angular dependence of a variation of the parameter introduced by the pupil expander into the image light, wherein the angular dependence of the variation of the parameter is determined across the output pupil from the obtained angular distribution of the parameter;
    wherein a spatial density of the non-uniformly spaced grid locations varies across the output pupil, being greater at an area of the output pupil having a larger spatial derivative of the variation of the parameter averaged over at least a portion of a field of view of the image.

2. The method of claim 1, wherein the parameter comprises a color coordinate of the image light.

3. The method of claim 1, wherein the parameter comprises at least one of power of a color channel or power of a luminance channel of the image light.

4. The method of claim 1, wherein the spatial density of the non-uniformly spaced grid locations across the output pupil is directly proportional to the spatial derivative of the averaged variation of the parameter.

5. The method of claim 1, further comprising determining the non-uniformly spaced grid locations by:
    obtaining the averaged variation of the parameter of the image light at a plurality of first grid locations at the output pupil of the pupil expander;
    determining the averaged variation of the parameter across the output pupil by interpolation between the plurality of first grid locations; and
    obtaining, from the averaged variation of the parameter across the output pupil, the spatial derivative of the determined averaged variation of the parameter across the output pupil.

6. The method of claim 5, wherein the first grid locations are uniformly spaced.

7. The method of claim 5, wherein the averaged variation of the parameter is determined by interpolation at a plurality of second grid locations spaced more densely than the plurality of first grid locations.

8. The method of claim 1, wherein the averaged variation of the parameter is determined by averaging the angular dependence of the variation of the parameter over the field of view of the image.

9. The method of claim 1, wherein the non-uniformly spaced grid comprises at least one of a rectangular grid or a polygonal grid.

10. The method of claim 1, wherein the non-uniformly spaced grid comprises a radial grid having a center proximate the area of the output pupil having the larger spatial derivative of the averaged variation of the parameter.

11. A method of operating a near-eye display (NED) comprising an image projector for providing image light conveying an image in angular domain, a pupil expander operably coupled to the image projector for expanding the image light over an eyebox of the NED, and an eye tracker for determining position of a user's eye pupil in the eyebox, the method comprising:
    using the eye tracker to determine a current position of the user's eye pupil in the eyebox;
    obtaining an angular dependence of a variation of a parameter of the image light introduced by the pupil expander at the determined position of the user's eye pupil by interpolation between previously determined angular dependencies of variation of the parameter at a plurality of non-uniformly spaced grid locations at the eyebox;
    adjusting the image to at least partially offset the angular dependence of the variation of the parameter introduced by the pupil expander;
    wherein a spatial density of the non-uniformly spaced grid locations varies across the eyebox, being greater at an area of the eyebox having a larger spatial derivative of the variation of the parameter averaged over at least a portion of a field of view of the image.

12. The method of claim 11, wherein the parameter comprises a color coordinate of the image light.

13. The method of claim 11, wherein the parameter comprises at least one of power of a color channel or power of a luminance channel of the image light.

14. The method of claim 11, wherein the spatial density of the non-uniformly spaced grid locations across the eyebox is directly proportional to the spatial derivative of the averaged variation of the parameter.

15. The method of claim 11, wherein the non-uniformly spaced grid locations have been determined by
    obtaining the averaged variation of the parameter of the image light at a plurality of first grid locations at the eyebox;
    determining the averaged variation of the parameter across the eyebox by interpolation between the plurality of first grid locations; and
    obtaining, from the averaged variation of the parameter across the eyebox, the spatial derivative of the determined averaged variation of the parameter across the eyebox.

16. The method of claim 15, wherein the averaged variation of the parameter is determined by interpolation at a plurality of second grid locations spaced more densely than the plurality of first grid locations.

17. A near-eye display (NED) comprising:
    an image projector for providing image light conveying an image in angular domain;
    a pupil expander operably coupled to the image projector for expanding the image light over an eyebox of the NED;
    an eye tracker for determining position of a user's eye pupil in the eyebox; and
    a controller operably coupled to the image projector and the eye tracker and configured to:
        use the eye tracker to determine a current position of the user's eye pupil;
        obtain an angular dependence of a variation of a parameter of the image light introduced by the pupil expander at the determined position of the user's eye pupil by interpolation between previously determined angular dependencies of variation of the parameter at a plurality of non-uniformly spaced grid locations at the eyebox of the NED;
        adjust the image to at least partially offset the angular dependence of the variation of the parameter introduced by the pupil expander; and
        cause the image projector to emit the image light conveying the adjusted image;
    wherein a spatial density of the non-uniformly spaced grid locations varies across the eyebox, being greater at an area of the eyebox having a larger spatial derivative of the variation of the parameter averaged over at least a portion of a field of view of the image.

18. The NED of claim 17, wherein the spatial density of the non-uniformly spaced grid locations across the eyebox is directly proportional to the spatial derivative of the averaged variation of the parameter.

19. The NED of claim 17, wherein the parameter comprises at least one of: a color coordinate; power of a color channel; or power of a luminance channel of the image light.

20. The NED of claim 17, wherein the pupil expander comprises a pupil-replicating waveguide.

* * * * *